(12) United States Patent
Suzuki et al.

(10) Patent No.: US 12,431,490 B2
(45) Date of Patent: Sep. 30, 2025

(54) ACTIVE MATERIAL, BATTERY, AND METHODS FOR PRODUCING THESE

(71) Applicant: TOYOTA JIDOSHA KABUSHIKI KAISHA, Toyota (JP)

(72) Inventors: Kazuhiro Suzuki, Hadano (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 18/301,340

(22) Filed: Apr. 17, 2023

(65) Prior Publication Data

US 2023/0253557 A1    Aug. 10, 2023

Related U.S. Application Data

(62) Division of application No. 17/329,480, filed on May 25, 2021, now Pat. No. 11,894,551.

(30) Foreign Application Priority Data

Jun. 5, 2020    (JP) .................................. 2020-098710

(51) Int. Cl.
*H01M 4/38*    (2006.01)
*H01M 4/04*    (2006.01)
*H01M 4/36*    (2006.01)

(52) U.S. Cl.
CPC ......... *H01M 4/386* (2013.01); *H01M 4/0471* (2013.01); *H01M 4/366* (2013.01)

(58) Field of Classification Search
None
See application file for complete search history.

(56) References Cited

U.S. PATENT DOCUMENTS

| 2012/0021283 A1 | 1/2012 | Chan et al. |
| 2013/0280609 A1 | 10/2013 | Chan et al. |
| 2015/0243986 A1 | 8/2015 | Negi et al. |
| 2020/0119352 A1* | 4/2020 | Kosaka ............ H01M 10/0585 |
| 2020/0176768 A1 | 6/2020 | Kosaka et al. |
| 2021/0020938 A1 | 1/2021 | Yamaguchi et al. |
| 2021/0384498 A1 | 12/2021 | Suzuki et al. |
| 2024/0014388 A1 | 1/2024 | Otaki et al. |

FOREIGN PATENT DOCUMENTS

| JP | 2013018679 A | 1/2013 |
| JP | 2014214054 A | 11/2014 |
| JP | 2020-087886 A | 6/2020 |

(Continued)

OTHER PUBLICATIONS

Kazuhiro Suzuki et al., Notice of Allowance of U.S. Appl. No. 17/329,480 issued on Aug. 9, 2023.

(Continued)

*Primary Examiner* — Zhongqing Wei
(74) *Attorney, Agent, or Firm* — Dickinson Wright, PLLC

(57) ABSTRACT

A main object of the present disclosure is to provide an active material wherein a volume variation due to charge/discharge is small. The present disclosure achieves the object by providing an active material comprising at least Si and Al, including a silicon clathrate type crystal phase, and a proportion of the Al to a total of the Si and the Al is 0.1 atm % or more and 1 atm % or less.

6 Claims, 4 Drawing Sheets

Silicon clathrate II type

(56) References Cited

FOREIGN PATENT DOCUMENTS

| JP | 2021031349 A | 3/2021 |
|---|---|---|
| JP | 2021192348 A | 12/2021 |
| JP | 2024008702 A | 1/2024 |
| KR | 10-2009-0053807 A | 5/2009 |
| WO | 2014050100 A1 | 4/2014 |

OTHER PUBLICATIONS

Nobuhira Abe, U.S. Appl. No. 17/729,725, Notice of Allowance dated Jan. 24, 2024.
Cerqueira et al., "Prediction and Synthesis of a Non-Zintl Silicon Clathrate," Chem. Mater. 2016, 28, 3711-3717.
T. Langer et al., "Electrochemical Lithiation of Silicon, Clathrate-II", Journal of the Electrochemical Society, vol. 159, No. 8, Jul. 20, 2012, pp. A1318-A1322.
Kazuhiro Suzuki et al., U.S. Appl. No. 17/329,480, filed Feb. 6, 2023, Restriction Requirement.
Kazuhiro Suzuki et al., U.S. Appl. No. 18/443,438, Non-Final Office Action issued Feb. 19, 2025.
J. Electrochem. Soc., 2019, 166, A3051-A3058. (Year: 2019).
Kazuhiro Suzuki et al., U.S. Appl. No. 18/443,438, Notice of Allowance issued May 20, 2025.

\* cited by examiner

Silicon clathrate I type

Silicon clathrate II type

Diamond type silicon

Example 1

Example 2

Example 3

Example 4

Comparative Example 3

ACTIVE MATERIAL, BATTERY, AND METHODS FOR PRODUCING THESE

RELATED APPLICATION

This application is a division of U.S. patent application Ser. No. 17/329,480, filed May 25, 2021, which claims priority to Japanese Patent Application No. 2020-098710, filed on Jun. 5, 2020, including the specification, drawings and abstract, the entire disclosure of which is incorporated herein by reference.

TECHNICAL FIELD

The present disclosure relates to an active material, a battery, and methods for producing these.

BACKGROUND ART

In recent years, development of batteries has been actively undergone. For example, in automobile industries, the development of a battery to be utilized for an electronic vehicle or a hybrid vehicle has been advanced. Also, as an active material used in the battery, Si has been known.

For example, Patent Literature 1 discloses that a silicon clathrate may be calculatory used as an anode active material of a lithium ion battery. Specifically, $Si_{46}$ and $Si_{34}$ are disclosed as the silicon clathrate.

Also, Patent Literature 2 discloses an electrode active material comprising a clathrate compound including a crystal lattice, and a guest substance included in the crystal lattice. Specifically, Patent Literature 2 discloses that the guest substance includes at least one kind selected from the group consisting of Ba, Ca, and Li; the crystal lattice includes at least one kind selected from the group consisting of Ga, Al, In, Ag, Au, Cu, Ni, and Co, and at least one kind selected from the group consisting of Si and Sn.

Also, Non-patent Literature 1 discloses a ternary silicon clathrate including I type crystal phase.

CITATION LIST

Patent Literatures

Patent Literature 1: US Patent Application Laid-Open No. 2012/0021283 Specification
Patent Literature 2: WO2014/050100

Non-Patent Literature

Non-patent Literature 1: Tiago F. T. Cerqueira et al., "Prediction and Synthesis of a Non-Zintl Silicon Clathrate", Chem. Mater. 2016, 28, 3711-3717

SUMMARY OF DISCLOSURE

Technical Problem

The theoretical capacity of Si is large, which is advantageous for the higher energy density of a battery. On the other hand, the volume variation of Si due to charge/discharge is large.

The present disclosure has been made in view of the above circumstances, and a main object of the present disclosure is to provide an active material wherein a volume variation due to charge/discharge is small.

Solution to Problem

In order to achieve the object, the present disclosure provides an active material comprising at least Si and Al, including a silicon clathrate type crystal phase, and a proportion of the Al to a total of the Si and the Al is 0.1 atm % or more and 1 atm % or less.

According to the present disclosure, since the active material includes a silicon clathrate type crystal phase, the volume variation due to charge/discharge may be diminished. Further, since the active material in the present disclosure includes Al in addition to Si, the volume variation due to charge/discharge may be diminished.

In the disclosure, the active material may include a void inside a primary particle.

In the disclosure, a void ratio of the void may be 2% or more and 15% or less.

In the disclosure, the active material may include a silicon clathrate II type crystal phase as the silicon clathrate type crystal phase.

Also, the present disclosure provides a battery comprising a cathode layer, an anode layer, and an electrolyte layer formed between the cathode layer and the anode layer, and the anode layer includes the above described active material.

According to the present disclosure, a battery wherein the volume variation due to charge/discharge is small may be obtained by using the above described active material.

Also, the present disclosure provides a method for producing an active material, the method comprising: a preparing step of preparing a Zintl compound including Na, Si, and Al, including at least a Zintl phase, and a proportion of the Al to a total of the Si and the Al is less than 10 atm %, a Na removing step of removing the Na from the Zintl compound, and forming an intermediate including a silicon clathrate type crystal phase, and an Al removing step of removing the Al from the intermediate.

According to the present disclosure, an active material wherein the volume variation due to charge/discharge is small may be obtained by using the Zintl compound including Al in addition to Na and Si.

In the disclosure, the preparing step may be a step of preparing the Zintl compound by carrying out a heat treatment to a raw material mixture including a Na source, a Si source and an Al source.

Also, the present disclosure provides a method for producing a battery, the method comprising: an active material producing step of producing an active material by the above described method for producing an active material, and an anode layer forming step of forming an anode layer by using the active material.

According to the present disclosure, a battery wherein the volume variation due to charge/discharge is small may be obtained by using the above described active material.

Advantageous Effects of Disclosure

The present disclosure exhibits effects such that an active material wherein a volume variation due to charge/discharge is small, may be obtained.

DESCRIPTION OF EMBODIMENTS

The active material, the battery, and the methods for producing these in the present disclosure are hereinafter described in detail.

A. Active Material

The active material in the present disclosure comprises at least Si and Al, includes a silicon clathrate type crystal phase, and a proportion of the Al to a total of the Si and the Al is 0.1 atm % or more and 1 atm % or less.

The active material in the present disclosure comprises a silicon clathrate type crystal phase. The framework atom of the silicon clathrate type crystal phase includes a basket-like structure (cage), and a metal ion such as Li ion may enter therein. Since the expansion quantity is small even when the metal ion enters the cage, the volume variation due to charge/discharge is small. Examples of the silicon clathrate type crystal phase may include silicon clathrate I type and II type crystal phase.

Figure 1A:
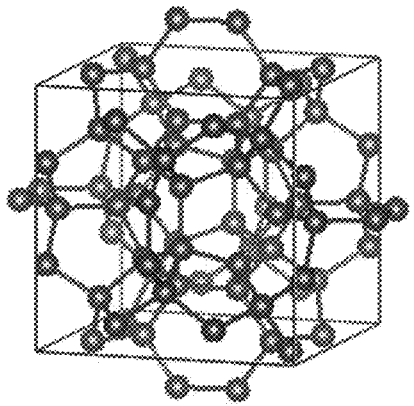
FIGS. 1A to 1C are schematic perspective views illustrating a Si crystal phase.
Figure 1B:
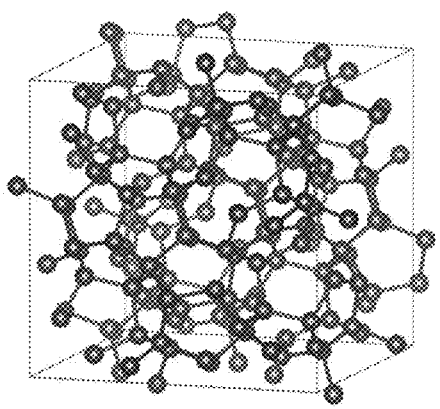
Figure 1C:
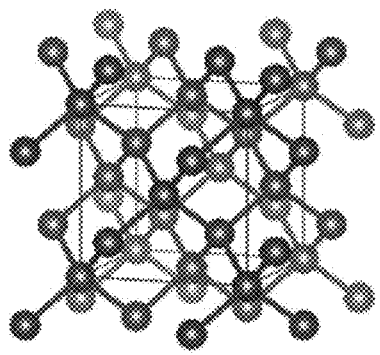

In the silicon clathrate I type and II type crystal phase, as shown in FIG. 1A and FIG. 1B, a polyhedron including a pentagon or a hexagon is formed with a plural of Si elements. The polyhedron has a space within thereof that is capable of including a metal ion such as a Li ion. By a metal ion being intercalated into this space, the volume variation due to charge/discharge may be suppressed. Also, since the silicon clathrate I type and II type crystal phase includes a space within thereof that is capable of including a metal ion, there is an advantage that the crystal structure is likely to be maintained even charged and discharged repeatedly. Also, particularly in an all solid state battery, a high confining pressure is generally needed to be applied in order to suppress the volume variation due to charge/discharge. However, the confining pressure may be reduced by using the active material in the present disclosure; as the result, an enlargement of a confining jig may be suppressed. Meanwhile, a usual Si particle includes a diamond type crystal phase. In the diamond type crystal phase, as shown in FIG. 1C, a tetrahedron is formed with a plural of Si elements. Since the tetrahedron does not have a space within thereof that is capable of including a metal ion such as a Li ion, the volume variation due to charge/discharge is large.

As described above, according to the present disclosure, since the active material includes a silicon clathrate type crystal phase, the volume variation due to charge/discharge may be diminished. Further, since the active material in the present disclosure includes Al in addition to Si, the volume variation due to charge/discharge may be diminished. The reason therefor is presumed that the cage get larger by a part of Si composing the cage of the silicon clathrate type crystal phase being substituted with Al, a different element. Also, since the cage get larger, the resistance when a metal ion is conducted is lowered. Also, as described later, the active material in the present disclosure preferably includes a void inside a primary particle, and in this case, the volume variation due to charge/discharge may further be suppressed since the void also contribute to the suppression of the volume variation, in addition to the silicon clathrate type crystal phase.

The active material in the present disclosure includes at least Si and Al. The active material may only include Si and Al as the metal element, and may include other metal element. Examples of the other metal element may include Na. Also the active material may include only Si, Al and Na as the metal element. The proportion of the total of Si and Al to all the metal elements included in the active material is, for example, 60 atm % or more, may be 70 atm % or more, and may be 80 atm % or more.

In the active material, the proportion of Al to the total of Si and Al is usually 0.1 atm % or more, and may be 0.2 atm % or more. Meanwhile, the proportion of Al to the total of Si and Al is usually 1 atm % or less.

The composition of the active material in the present disclosure is not particularly limited, and is preferably a composition represented by $Na_x(Si, Al)_{136}$ ($0 \leq x \leq 20$). The "x" may be 0, and may be more than 0. Meanwhile the "x" may be 10 or less, and may be 5 or less. The composition of the active material may be determined by, for example, EDX, XRD, XRF, ICP, and an atomic absorption spectrometry.

The active material in the present disclosure includes a silicon clathrate type crystal phase. The active material preferably includes the silicon clathrate type as a main phase. "Including the silicon clathrate type as a main phase" indicates that, among the peaks observed in X-ray diffraction measurement, a peak belonging to the silicon clathrate type crystal phase is the peak with the strongest diffraction intensity. The definition relating "main phase" is similar for other crystal phase. Also, the silicon clathrate type crystal phase includes at least Si, and may further include Al. That is, a part of Si composing the silicon clathrate type crystal phase may be substituted with Al.

Examples of the silicon clathrate type crystal phase may include a silicon clathrate I type crystal phase and a silicon clathrate II type crystal phase. The active material in the present disclosure may include the silicon clathrate I type crystal phase as a main phase, and may include the silicon clathrate II type crystal phase as a main phase, and the latter is preferable. The reason therefor is to further suppress the volume variation due to charge/discharge.

Also, the active material in the present disclosure may (i) include the silicon clathrate I type crystal phase and no silicon clathrate II type crystal phase, (ii) include no silicon clathrate I type crystal phase and include the silicon clathrate II type crystal phase, and (iii) include the silicon clathrate I type crystal phase and the silicon clathrate II type crystal phase. "Including no crystal phase" may be confirmed by the peak of the crystal phase not being observed in X-ray diffraction measurement. The definition relating "including no crystal phase" is similar for other crystal phase.

The silicon clathrate I type crystal phase usually belongs to the space group (Pm-3n). The silicon clathrate I type crystal phase has a typical peak at a position of $2\theta=19.44°$, 21.32°, 30.33°, 31.60°, 32.82°, 36.29°, 52.39°, and 55.49° in X-ray diffraction measurement using a CuKα ray. These peak positions may be shifted respectively in a range of ±0.50°, may be shifted in a range of ±0.30°, and may be shifted in a range of ±0.10°.

The silicon clathrate II type crystal phase usually belongs to the space group (Fd-3m). The silicon clathrate II type crystal phase has a typical peak at a position of $2\theta=20.09°$, 21.00°, 26.51°, 31.72°, 36.26°, and 53.01° in X-ray diffraction measurement using a CuKα ray. These peak positions may be shifted respectively in a range of ±0.50°, may be shifted in a range of ±0.30°, and may be shifted in a range of ±0.10°.

The lattice constant of the silicon clathrate II type crystal phase is, for example, 14.702 Å or more, and may be 14.706 Å or more. Meanwhile, the lattice constant of the silicon clathrate II type crystal phase is, for example, 14.717 Å or less. The lattice constant may be determined by carrying out XRD measurement to the active material, and analyzing the obtained XRD chart with Rietveld method.

Also, the active material in the present disclosure may or may not include diamond type Si crystal phase. The diamond type Si crystal phase has a typical peak at a position of 2θ=28.44°, 47.31°, 56.10°, 69.17°, and 76.37°, in an X-ray diffraction measurement using a CuKα ray. These peak positions may be shifted respectively in a range of ±0.50°, may be shifted in a range of ±0.30°, and may be shifted in a range of ±0.10°.

The peak intensity of peak "A" at a position of 2θ=31.72°±0.50° in the silicon clathrate II type crystal phase is regarded as $I_A$, and the peak intensity of peak "B" at a position of 2θ=28.44°±0.50° in the diamond type Si crystal phase is regarded as $I_B$. $I_B/I_A$ is, for example, less than 1, may be 0.5 or less, and may be 0.3 or less.

Also, the active material in the present disclosure preferably has no peak deriving from the bi-product described later. The details for the bi-product will be described in "C. Method for producing active material" later.

Examples of the shape of the active material in the present disclosure may include a granular shape. The active material may be a primary particle, and may be a secondary particle wherein the primary particles are agglutinated. In either case, the active material preferably includes a void inside the primary particle. The void ratio of the void is, for example, 2% or more, may be 5% or more, and may be 10% or more. Also, the void ratio is, for example, 40% or less, may be 20% or less, and may be 15% or less.

The void ratio may be determined by, for example, the following procedure. First, a cross-section of an electrode layer including an active material is obtained by conducting an ion milling process thereto. Then, the cross-section is observed with a SEM (scanning electron microscope), and a photograph of the particle is taken. In the obtained photograph, the silicon part and the void part are rigidly distinguished and digitalize with an image analyzing software. The areas of the silicon part and the void part are determined, and the void ratio (%) is calculated from the below described formula.

Void ratio (%)=100×(void part area)/((silicon part area)+(void part area))

The specific image analyzing and the calculation of the void ratio may be conducted as described below. As the image analyzing software, for example, Fiji ImageJ bundled with Java 1.8.0_172 (hereinafter, Fiji) is used. The image is colorized into an RGB color image by combining a secondary electron image and a reflection electron image in the same field of view. Then, in order to eliminate the noise of each pixel, the obtained RGB image is blurred with the function of Fiji "Median (filter size=2)". Next, with the function of Fiji "Weka Machine Learning", a plurality of arbitrary regions in the noise eliminated image are specified into the silicon part or the void part respectively by a person, and teaching data wherein the silicon part and the void part are rigidly distinguished, are formed. Then, based on the formed teaching data, the silicon part and the void part are discriminated with a machine in Fiji, and the area ratio of the silicon part and the void part is calculated.

In relation to the colorizing into the RGB color image, since both of the secondary electron image and the reflection electron image are displayed in a grayscale, the brightness "x" of each pixel in the secondary electron image is assigned to Red value, and the brightness "y" in the reflection electron image is similarly assigned to Green value, for example. Thereby, each pixel are colorized into an RGB color image as, for example, R=x, G=y, B=(x+y)/2.

The detailed conditions in "Weka Machine Learning" described above will be hereinafter described. As training features (numerical features of an image to be focused by a machine when forming teaching data in a machine learning), Gaussian blur, Hessian, Membrane projections, Mean, Maximum, Anisotropic diffusion, Sobel filter, Difference of gaussians, Variance, Minimum, Median are selected. Also, for other parameters, Membrane thickness is set to 3, Membrane patch size is set to 19, Minimum sigma is set to 1.0, and Maximum sigma is set to 16.0.

The average particle size of the primary particle is, for example, 50 nm or more, may be 100 nm or more, and may be 150 nm or more. Meanwhile, the average particle size of the primary particle is, for example, 3000 nm or less, may be 1500 nm or less, and may be 1000 nm or less. Also, the average particle size of the secondary particle is, for example, 1 μm or more, may be 2 μm or more, and may be 5 μm or more. Meanwhile, the average particle size of the secondary particle is, for example, 60 μm or less, and may be 40 μm or less. Incidentally, the average particle size may be determined by observation with a SEM, for example. The number of the sample is preferably large; for example, 20 or more, may be 50 or more, and may be 100 or more.

The active material in the present disclosure is usually used for a battery. The active material in the present disclosure may be an anode active material, may be a cathode active material, and the former is preferable. In the present disclosure, an electrode layer (anode layer or cathode layer) including the above described active material, and a battery including the electrode layer may be provided. Examples of the method for producing an active material may include the method for producing described in "C. Method for producing active material" later.

B. Battery

Figure 2:
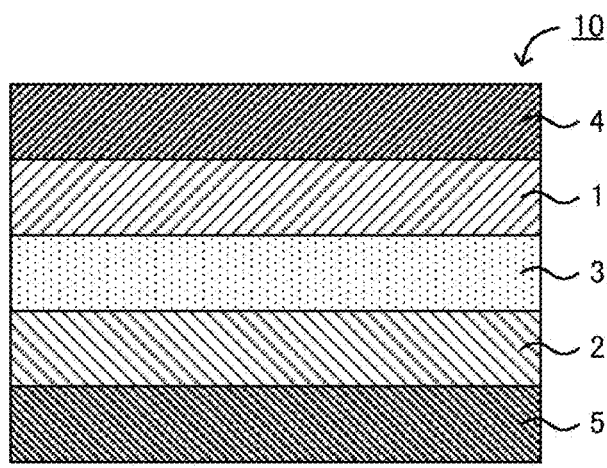
FIG. 2 is a schematic cross-sectional view illustrating an example of the battery in the present disclosure.

FIG. 2 is a schematic cross-sectional view illustrating an example of the battery in the present disclosure. Battery 10 shown in FIG. 2 comprises cathode layer 1, anode layer 2, electrolyte layer 3 formed between cathode layer 1 and anode layer 2, cathode current collector 4 for collecting currents of cathode layer 1, and anode current collector 5 for collecting currents of anode layer 2. In the present disclosure, anode layer 2 includes the active material described in "A. Active material" above.

According to the present disclosure, a battery wherein the volume variation due to charge/discharge is small, may be obtained by using the above described active material.

1. Anode Layer

The anode layer is a layer including at least an anode active material. The anode active material may be in the same contents as those described in "A. Active material" above; thus, the description herein is omitted. The proportion of the anode active material in the anode layer is, for example, 20 weight % or more, may be 30 weight % or more, and may be 40 weight % or more. When the proportion of the anode active material is too low, a sufficient energy density may not be obtained. Meanwhile, the proportion of the anode active material is, for example, 80 weight % or less, may be 70 weight % or less, and may be 60 weight % or less. When the proportion of the anode active material is too high, an ion conductivity and an electron conductivity in the anode layer may be reduced, relatively.

The anode layer may include at least one of an electrolyte, a conductive material, and a binder as required. Examples of the electrolyte may include the electrolyte which will be described in "3. Electrolyte layer" later. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber-based binders and fluorine-based binders.

The thickness of the anode layer is, for example, 0.1 μm or more and 1000 μm or less. The anode layer in the present disclosure is usually used for a battery.

2. Cathode Layer

The cathode layer is a layer including at least a cathode active material. Also, the cathode layer may include at least one of an electrolyte, a conductive material, and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

A coating layer including a Li ion conductive oxide may be formed on the surface of the oxide active material. The reason therefor is to suppress the reaction of the oxide active material with the solid electrolyte (particularly sulfide solid electrolyte). Examples of the Li ion conductive oxide may include $LiNbO_3$. The thickness of the coating layer is, for example, 1 nm or more and 30 nm or less. Also, $Li_2S$ may be used, for example, as the cathode active material.

Examples of the shape of the cathode active material may include a granular shape. The average particle size ($D_{50}$) of the cathode active material is not particularly limited; is, for example, 10 nm or more, and may be 100 nm or more. Meanwhile, the average particle size ($D_{50}$) of the cathode active material is, for example, 50 μm or less, and may be 20 μm or less. The average particle size ($D_{50}$) may be calculated from the measurement by, for example, a laser diffraction type particle size distribution meter, and a scanning electron microscope (SEM).

The electrolyte, the conductive material and the binder used for the cathode layer may be in the same contents as those described in "1. Anode layer" above; thus, the description herein is omitted. The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, and may be an electrolyte solution (liquid electrolyte).

Examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte. Examples of the sulfide solid electrolyte may include solid electrolyte including Li, X (X is at least one kind of P, As, Sb, Si, Ge, Sn, B, Al, Ga, and In) and S. Also, the sulfide solid electrolyte may further include at least either one of O and halogen. Examples of the halogen may include F, Cl, Br, and I. The sulfide solid electrolyte may be a glass (amorphous), and may be a glass ceramic. Examples of the sulfide solid electrolyte may include $Li_2S$—$P_2S_5$, $LiI$—$Li_2S$—$P_2S_5$, $LiI$—$LiBr$—$Li_2S$—$P_2S_5$, $Li_2S$—$SiS_2$, $Li_2S$—$GeS_2$, and $Li_2S$—$P_2S_5$—$GeS_2$.

The liquid electrolyte preferably includes a supporting salt and a solvent. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN (CF_3SO_2)_2$, $LiN (C_2F_5SO_2)_2$, $LiN(FSO_2)_2$, and $LiC(CF_3SO_2)_3$. Examples of the solvent used for the liquid electrolyte may include cyclic esters (cyclic carbonates) such as ethylene carbonate (EC), propylene carbonate (PC), and butylene carbonate (BC); and chain esters (chain carbonates) such as dimethyl carbonate (DMC), diethyl carbonate (DEC), and ethylmethyl carbonate (EMC). The liquid electrolyte preferably includes two kinds or more of the solvents.

The thickness of the electrolyte layer is, for example, 0.1 μm or more and 1000 μm or less.

4. Other Constitutions

The battery in the present disclosure preferably comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

The battery in the present disclosure may further include a confining jig that applies a confining pressure along the thickness direction, to the cathode layer, the electrolyte layer and the anode layer. Particularly, when the electrolyte layer is a solid electrolyte layer, the confining pressure is preferably applied in order to form a favorable ion conductive path and an electron conductive path. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The kind of the battery in the present disclosure is not particularly limited; and is typically a lithium ion battery. Also, the battery in the present disclosure may be a liquid battery in which a liquid electrolyte is included as the electrolyte layer, and may be an all solid state battery in which a solid electrolyte layer is included as the electrolyte layer. Also, the battery in the present disclosure may be a primary battery and may be a secondary battery; above all, preferably the secondary battery so as to be repeatedly charged and discharged, and be useful as a car-mounted battery, for example.

The battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

C. Method for Producing Active Material

Figure 3:
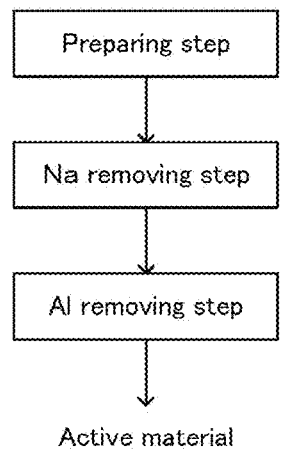
FIG. 3 is a flow chart illustrating an example of the method for producing an active material in the present disclosure.

FIG. 3 is a flow chart illustrating an example of the method for producing an active material in the present disclosure. At first, in the method for producing shown in FIG. 3, a Zintl compound including Na, Si, and Al, including at least a Zintl phase, and a proportion of Al to a total of Si and Al is less than 10 atm %, is prepared (preparing step). Next, Na is removed from the Zintl compound, and an intermediate including a silicon clathrate type crystal phase is formed (Na removing step). Then, Al is removed from the intermediate (Al removing step). Thereby, an active material including a silicon clathrate type crystal phase, and also including a void inside a primary particle may be obtained.

According to the present disclosure, an active material wherein the volume variation due to charge/discharge is small may be obtained by using the Zintl compound including Al in addition to Na and Si.

1. Preparing Step

The preparing step in the present disclosure is a step of preparing a Zintl compound including Na, Si, and Al, including at least a Zintl phase, and a proportion of the Al to a total of the Si and the Al is less than 10 atm %.

The Zintl compound includes at least Na, Si, and Al. As the metal element, the Zintl compound may include only Na, Si and Al, and may include other metal element. The proportion of the total of Na, Si and Al to all the metal elements included in the Zintl compound is, for example, 70 atm % or more, may be 80 atm % or more, and may be 90 atm % or more.

In the Zintl compound, the proportion of the Al to a total of the Si and the Al is, for example, 0.1 atm % or more, may be 0.5 atm % or more, and may be 1 atm % or more. Meanwhile, the proportion of the Al to a total of the Si and the Al is usually less than 10 atm %, and may be 8 atm % or less. The composition of the Zintl compound is not particularly limited; and a composition represented by $Na_z$ $(Si, Al)_{136}$, $(121 \leq z \leq 151)$ is preferable. The "z" may be 126 or more, and may be 131 or more. Meanwhile, the "z" may be 141 or less.

The Zintl compound includes a Zintl phase. The Zintl phase has a typical peak at a position of 2θ=16.10°, 16.56°, 17.64°, 20.16°, 27.96°, 33.60°, 35.68°, 40.22°, and 41.14° in X-ray diffraction measurement using a CuKα ray. These peak positions may be shifted respectively in a range of ±0.50°, and may be shifted in a range of ±0.30°. The Zintl compound preferably includes the Zintl phase as a main phase. The Zintl compound may or may not include a silicon clathrate I type crystal phase. Also, the Zintl compound may or may not include a silicon clathrate II type crystal phase.

The intermediate may include a Zintl phase including Na, Si and Al, and a by-product including at least Al. The Zintl phase preferably includes Na, Si and Al. A typical Zintl phase is composed of Na and Si; however, it is presumed that, when a part of Si thereof is substituted with Al, a desired silicon clathrate type crystal phase (a silicon clathrate type crystal phase wherein a part of Si is substituted with Al) is likely to be obtained.

The by-product includes at least Al. The by-product preferably has a peak at a position of 2θ=34.8°, and 36.0° in X-ray diffraction measurement using a CuKα ray. These peak positions may be shifted respectively in a range of ±0.3°, and may be shifted in a range of ±0.1°. In addition to Al, the by-product may include at least either one of Na and O.

The Zintl compound may be obtained by carrying out a heat treatment to a raw material mixture including a Na source, a Si source, and Al source. Examples of the Na source may include a simple substance of Na, and an alloy including Na as a main component. Examples of the Si source may include a simple substance of Si, and an alloy including Si as a main component. Examples of the Al source may include a simple substance of Al, an alloy including Al as a main component, and an Al oxide. Examples of the Al oxide may include $Al_2O_3$.

The proportion between Na and the total of Si and Al in the raw material mixture is not particularly limited; to 1 mol part of the total of Si and Al, Na is, for example, 0.8 mol parts or more, and may be 1 mol part or more. Meanwhile, to 1 mol part of the total of Si and Al, Na is, for example, 1.5 mol parts or less, and may be 1.3 mol parts or less. Also, the proportion of Al to the total of Si and Al in the raw material mixture is, for example, 0.1 atm % or more, may be 0.5 atm % or more, and may be 1 atm % or more. Meanwhile, the proportion of Al to the total of Si and Al in the raw material mixture is, for example, less than 10 atm %, and may be 8 atm % or less.

The heat treatment temperature is, for example, 500° C. or more and 1000° C. or less. Also, the heat treating time is, for example, 1 hour or more and 50 hours or less. Particularly, it is preferable to conduct the heat treatment under the conditions of approximately 700° C. (such as 650° C. or more and 750° C. or less) and approximately 20 hours (such as 15 hours or more and 25 hours or less).

2. Na Removing Step

The Na removing step in the present disclosure is a step of removing the Na from the Zintl compound, and forming an intermediate including a silicon clathrate type crystal phase.

Examples of the method for removing Na from the Zintl compound may include a heat treatment. The heat treatment temperature is, for example, 280° C. or more, and may be 300° C. or more. Meanwhile, the heat treatment temperature is, for example, 500° C. or less. The heat treating time is, for example, 1 hour or more and 50 hours or less. The heat treatment may be conducted under ambient pressure atmosphere, and may be conducted under reduced pressure atmosphere. In the latter case, the pressure at the time of heat treatment is, for example, 10 Pa or less, may be 1 Pa or less, and may be 0.1 Pa or less. Also, the heat treatment may be conducted under inert atmosphere such as an Ar atmosphere.

The intermediate includes a silicon clathrate type crystal phase. The intermediate preferably includes the silicon clathrate type crystal phase as a main phase. The intermediate may include a silicon clathrate I type crystal phase as a main phase, and may include a silicon clathrate II type crystal phase as a main phase, and the latter is preferable. The reason therefor is to further suppress the volume variation due to charge/discharge.

Also, the intermediate may (i) include the silicon clathrate I type crystal phase and no silicon clathrate II type crystal phase, (ii) include no silicon clathrate I type crystal phase and include the silicon clathrate II type crystal phase, and (iii) include the silicon clathrate I type crystal phase and the silicon clathrate II type crystal phase. The composition of the intermediate is not particularly limited; and a composition represented by $Na_y(Si, Al)_{136}$ $(0 \leq y \leq 24)$ is preferable. The "y" may be 0, and may be more than 0. Meanwhile, the "y" may be 20 or less, and may be 10 or less.

3. Al Removing Step

The Al removing step in the present disclosure is a step of removing the Al from the intermediate. The phrase "remove Al" includes a case where a compound including Al (such as above described by-product) is removed. By removing Al, an active material including a void inside a primary particle may be obtained.

Examples of a method for removing Al from the intermediate may include an acid treatment. The acid treatment is, for example, a treatment wherein the intermediate is brought into contact with an acid solution. The acid solution includes, for example, an acid and a solvent. Examples of the acid used for the acid solution may include hydrochloric acid, sulfuric acid, acetic acid, formic acid, propionic acid, oxalic acid, and hydrofluoric acid. The solvent used for the acid solution may be water, and may be an organic solvent. Also, the acid concentration (normality) in the acid solution is not particularly limited, and is, for example, 0.5 N or more and 3 N or less. Incidentally, instead of the acid solution, an acid itself, not diluted with a solvent, may be used.

4. Active Material

The active material obtained by each of the above described step includes the silicon clathrate type crystal phase. Also, the active material includes at least Si and Al, and the proportion of the Al to a total of the Si and the Al is preferably in a predetermined range. Further, the active material preferably includes a void inside a primary particle. For the preferable embodiment of the active material, the contents described in "A. Active material" above may be appropriately referred.

D. Method for Producing Battery.

The present disclosure provides a method for producing a battery, the method comprising: an active material producing step of producing an active material by the above described method for producing an active material, and an anode layer forming step of forming an anode layer using the active material.

According to the present disclosure, by using the above described active material, a battery wherein a volume variation due to charge/discharge is small, may be obtained. Incidentally, the active material producing step may be in the same contents as those described in "C. Method for producing active material" above.

In the anode layer forming step, an anode layer is formed using the active material. The method for forming an anode layer is not particularly limited, and a known method may be adopted. An anode layer formed on an anode current collector may be obtained by, for example, coating the anode current collector with a slurry including at least an active material, and drying. For the preferable embodiment of the obtained anode layer, the contents described in "B. Battery, 1. Anode layer" above may be appropriately referred.

The method for forming a battery is not particularly limited, and a known method may be adopted. Besides the active material producing step and the anode layer forming step, the method for producing a battery in the present disclosure may include the following steps; a cathode layer forming step of forming a cathode layer, an electrolyte layer forming step of forming an electrode layer, and placing step of placing a cathode layer, an electrode layer, and an anode layer in this order. For the preferable embodiment of the obtained battery, the contents described in "B. Battery" above may be appropriately referred.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Synthesis of Active Material>

A simple substance of Si (purity of 99%, includes Si oxide layer on the surface thereof), a simple substance of Al, and a simple substance of Na (purity of 99.5%) were mixed so as to be simple substance of Si:simple substance of Al:simple substance of Na=0.995:0.005:1.1 in the molar ratio (atm ratio). In the obtained mixture, the proportion of Al to the total of Si and Al was 0.5 atm %. Then, the obtained mixture was projected into a boron nitride melting pot, the pot was sealed under an Ar atmosphere, and heated under conditions of 700° C. and 20 hours so as to synthesize a Zintl compound (lumps) including Na, Si, and Al. The obtained Zintl compound was crushed, and heated under vacuum (approximately 0.1 Pa), under conditions of 340° C. for 20 hours to remove Na, so as to obtain an intermediate. The obtained intermediate was acid treated for 10 minutes with diluted hydrochloric acid (1N) to remove Al (by-product including Al) to obtain an active material.

<Production of Anode>

A dispersing medium (butyl butyrate), a binder (a butyl butyrate solution containing 5 weight % of dissolved polyvinylidene fluoride), the above described active material, a solid electrolyte ($Li_2S$—$P_2S_5$ based glass ceramic), and a conductive material (VGCF (vapor grown carbon fiber)) were added to a polypropylene container, the container was shaken with a shaker (TTM-1, from Sibata Scientific Technology LTD.) for 3 minutes, and further stirred for 30 seconds with an ultrasonic dispersion apparatus to produce a slurry for an anode layer. An anode current collector (Cu foil) was coated with the slurry for an anode layer by a blade method using an applicator, then, dried for 30 minutes on a hot plate adjusted to be 100° C. An anode including an anode layer and an anode current collector was obtained in the above manner.

<Production of Cathode>

A dispersing medium (butyl butyrate), a binder (a butyl butyrate solution containing 5 weight % of dissolved polyvinylidene fluoride), a cathode active material ($LiNi_{1/3}Co_{1/3}Mn_{1/3}O_2$ coated with lithium niobate), a solid electrolyte ($Li_2S$—$P_2S_5$ based glass ceramic), and a conductive material (VGCF (vapor grown carbon fiber)) were added to a polypropylene container, the container was shaken with a shaker (TTM-1, from Sibata Scientific Technology LTD.) for 3 minutes, and further stirred for 30 seconds with an ultrasonic dispersion apparatus to produce a slurry for a cathode layer. A cathode current collector (aluminum foil) was coated with the slurry for a cathode layer by a blade method using an applicator, then, dried for 30 minutes on a hot plate adjusted to be 100° C. A cathode including a cathode layer and a cathode current collector was obtained in the above manner.

<Production of Solid Electrolyte Layer>

A dispersing medium (heptane), a binder (a heptane solution containing 5 weight % of dissolved butadiene rubber), and a solid electrolyte ($Li_2S$—$P_2S_5$ based glass ceramic including lithium iodide) were added to a polypropylene container, the container was stirred for 30 seconds with an ultrasonic dispersion apparatus. Then, the polypropylene container was shaken with a shaker for 30 minutes to produce a slurry for a solid electrolyte layer. An aluminum foil as a substrate was coated with the slurry for a solid electrolyte layer by a blade method using an applicator, then, dried for 30 minutes on a hot plate adjusted to be 100° C. to produce a solid electrolyte layer on the substrate.

<Production of Evaluation Battery>

The anode, solid electrolyte layer, and cathode were stacked in this order, and the obtained stack was pressed under conditions of 130° C., 200 MPa, and 3 minutes to obtain an evaluation battery.

Examples 2 to 4

An active material and an evaluation battery were obtained in the same manner as in Example 1 except that the proportion of Al to the total of Si and Al (charged Al amount) was changed to 1 atm % (Example 2), 3 atm % (Example 3) and 5 atm % (Example 4).

Comparative Example 1

An active material and an evaluation battery were obtained in the same manner as in Example 1 except that the simple substance of Al was not used.

Comparative Example 2

An active material and an evaluation battery were obtained in the same manner as in Example 2 except that the acid treatment was not carried out.

Comparative Example 3

An active material and an evaluation battery were obtained in the same manner as in Example 1 except that the proportion of Al to the total of Si and Al (charged Al amount) was changed to 10 atm %.

[Evaluation]

<XRD Measurement>

An X-ray diffraction (XRD) measurement using a CuKα ray was conducted to the active materials obtained in Examples 1 to 4 and Comparative Examples 1 to 3. It was confirmed that all of the active materials obtained in Examples 1 to 4 and Comparative Examples 1 to 3 include the silicon clathrate II type crystal phase as a main phase. Also, the lattice constant was determined by analyzing the XRD pattern of the silicon clathrate II type crystal phase by Rietveld method. Further, comparative values of the lattice constant in Examples 1 to 4 and Comparative Examples 2 and 3 were determined by setting the lattice constant in Comparative Example 1 as a standard. The results are shown in Table 1.

Figure 4A:
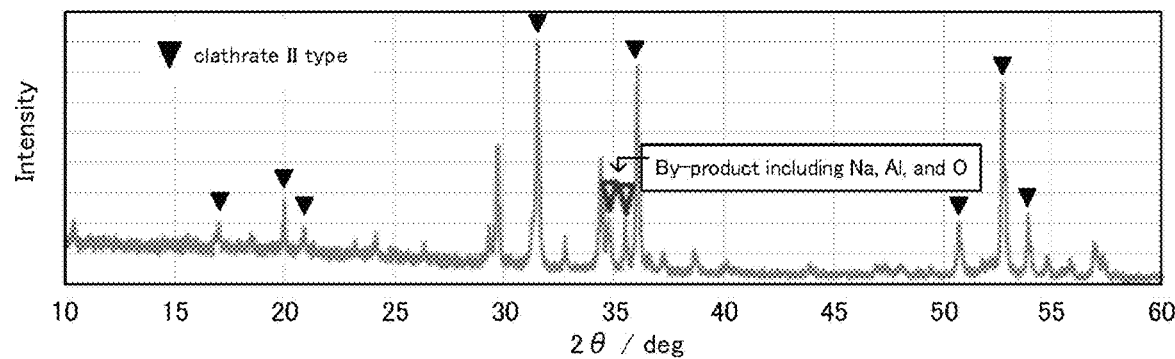
FIGS. 4A and 4B are the results of an XRD measurement of the intermediate and the active material obtained in Example 2.
Figure 4B:
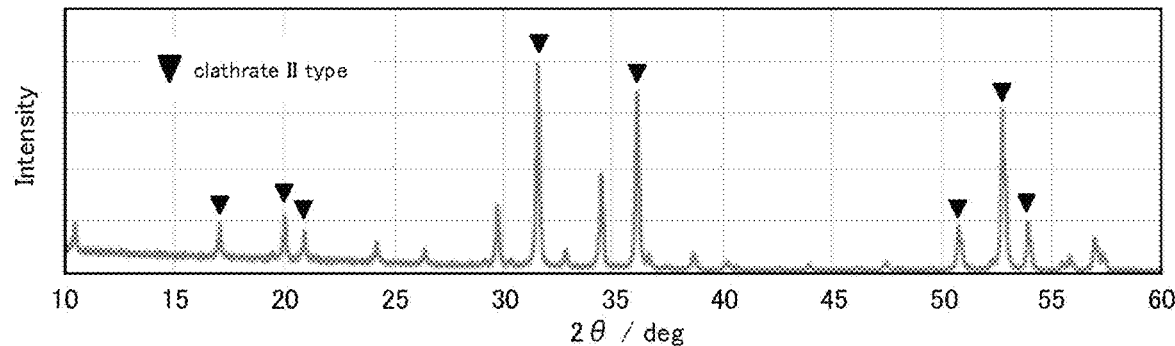

Also, as the typical results, XRD charts of the intermediate (before acid treatment) and the active material (after acid treatment) obtained in Example 2 are shown in FIG. 4A and FIG. 4B. As shown in FIG. 4A, it was confirmed that the intermediate before the acid treatment included the silicon clathrate II type crystal phase as a main phase, and further, including a peak deriving from the by-product at a position of 2θ=34.8°, and 36.0°. Meanwhile, as shown in FIG. 4B, it was confirmed that the active material after the acid treatment also included the silicon clathrate II type crystal phase as a main phase as similar to the intermediate. Meanwhile, unlike the intermediate, the peak deriving from the by-product was disappear in the active material after the acid treatment. That is, it was confirmed that the by-product was removed by the acid treatment.

<SEM-EDX Measurement>

Figure 5:
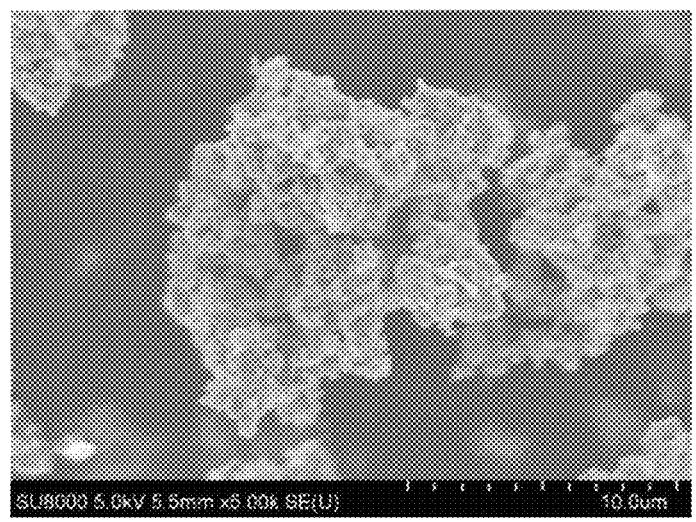
FIG. 5 is the result of a SEM observation of the active material obtained in Example 2.
Figure 6A:
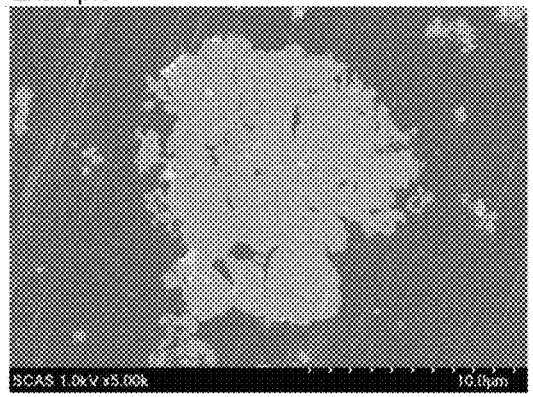
FIGS. 6A to 6E are the results of a SEM observation (cross-section) of the active materials obtained in Examples 1 to 4 and Comparative Example 3.
Figure 6B:
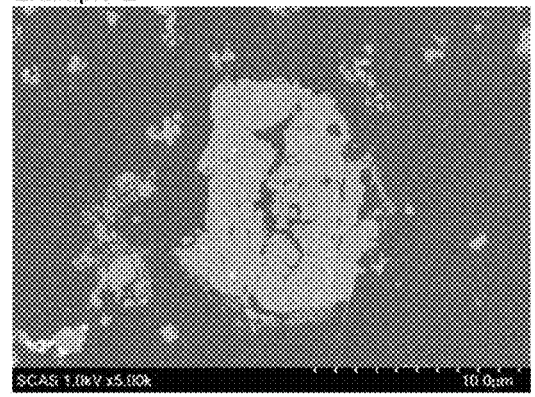
Figure 6C:
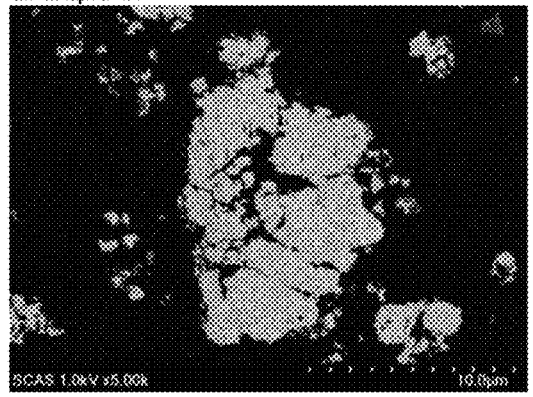
Figure 6D:
Figure 6E:
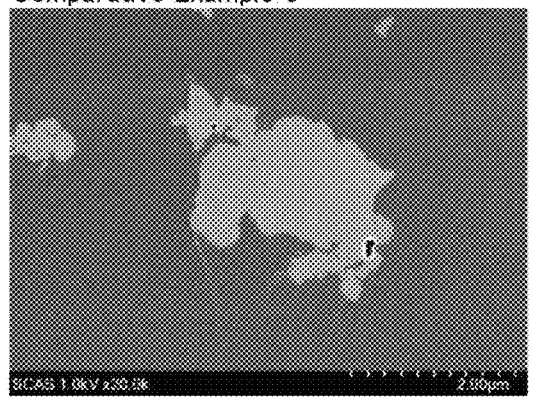

A SEM-EDX (scanning electron microscope-energy dispersion type X-ray spectroscope) measurement was carried out for the active materials obtained in Examples 1 to 4 and Comparative Examples 1 to 3. As the typical result, a SEM image of the active material obtained in Example 2 is shown in FIG. 5. As shown in FIG. 5, it was confirmed that the active material obtained in Example 2 was porous. Also, from the EDX result, it was confirmed that Al and Na were dispersed uniformly. Also, O was detected at the proportion higher than Al and lower than Na. Also, the proportion of Al to the total of Si and Al was determined from EDX result, and was 0.2 atm %. Also, it was suggested by the SEM-EDX measurement for the intermediate that the by-product included Na, Al, and O.

For the active materials obtained in Examples 1 to 4 and Comparative Examples 1 to 3, the cross-section of the particle was observed with SEM. The results (the results when Al was added, and acid treatment was conducted) in Examples 1 to 4 and Comparative Example 3 are shown in FIGS. 6A to 6E. As shown in FIGS. 6A to 6E, a void was formed inside the primary particle. Also, the void ratio was determined by image analyzing the SEM images. The results are shown in Table 1.

<Confining Pressure Increase Measurement>

The confining pressure increase was measured by charging the evaluation batteries obtained in Examples 1 to 4 and Comparative Examples 1 to 3. Specifically, the evaluation batteries were confined under pressure of 5 MPa with a confining jig wherein a confining pressure may be measured with a load cell, put in a desiccator, charged at 0.1 C, to voltage of 4.55 V at constant current, the confining pressure at 4.55 V was measured, and the confining pressure increase from the state before the charge was determined. The results are shown in Table 1. Incidentally, the results of the confining pressure increase in Table 1 are relative values when the result in Comparative Example 1 is regarded as 1.

TABLE 1

| | Charged Al amount (atm %) | Acid treatment | Lattice constant (Å) | Lattice constant (comparative ratio) | Al content (atm %) | Void ratio (%) | Confining pressure increase (comparative ratio) |
|---|---|---|---|---|---|---|---|
| Example 1 | 0.5 | Treated | 14.702 | 1.0001 | 0.1 | 5.8 | 0.92 |
| Example 2 | 1 | Treated | 14.706 | 1.0004 | 0.2 | 11.7 | 0.86 |
| Example 3 | 3 | Treated | 14.711 | 1.0007 | 0.5 | 14.9 | 0.79 |
| Example 4 | 5 | Treated | 14.717 | 1.0012 | 1 | 2.7 | 0.90 |
| Comp. Ex. 1 | 0 | Treated | 14.700 | 1 | 0 | 0 | 1 |
| Comp. Ex. 2 | 1 | Not treated | 14.705 | 1.0003 | 1 | 0 | 1.15 |
| Comp. Ex. 3 | 10 | Treated | 14.708 | 1.0005 | 1.8 | 2 | 1.32 |

As shown in Table 1, it was confirmed that the confining pressure was decreased in Examples 1 to 4, compared to Comparative Examples 1 to 3. Also, the following points were confirmed. First, in relation to the lattice constant, it was confirmed that the lattice constant were larger in Examples 1 to 4, compared to Comparative Example 1. The reason why the lattice constant was larger is presumed because a part of Si was substituted with a different element Al. It is presumed that the cage of the silicon clathrate type crystal phase was enlarged (the density as the active material was lowered) by this substitution, as the result, it was possible to suppress the increase of the confining pressure even when Li was inserted.

Next, in Examples 1 to 4, the by-product was removed by carrying out the acid treatment, and a void was formed inside a primary particle. As described above, in Examples 1 to 4, it is presumed that it was possible to suppress the increase of the confining pressure even when Li was inserted, because the void was formed inside a primary particle. Meanwhile, since Al was not added in Comparative Example 1, the void was not formed inside a primary particle.

Since the acid treatment was not carried out in Comparative Example 2, the void was not formed inside a primary particle. It is presumed that since the acid treatment was not carried out in Comparative Example 2, the by-product remained in the active material so that the effect of suppressing the confining pressure increase was not obtained. Also, it is presumed that the Li ion path was inhibited since the remained by-product induced a resistance so that the resistance was increased.

Also, the confining pressure increase was larger in Comparative Example 3 than in Comparative Example 1. The reason therefor is presumed that, since the charged Al amount is high, the production of the by-product was also increased so that it was difficult to maintain the silicon clathrate type crystal phase after the acid treatment.

REFERENCE SIGNS LIST

1 . . . cathode layer
2 . . . anode layer
3 . . . electrolyte layer
4 . . . cathode current collector
5 . . . anode current collector
10 . . . battery

What is claimed is:

1. A method for producing an active material, the method comprising:
   a preparing step of preparing a Zintl compound including Na, Si, and Al, and including at least a Zintl phase,
   a Na removing step of removing the Na from the Zintl compound, and forming an intermediate including a silicon clathrate type crystal phase, and
   an Al removing step, after the Na removing step, of removing the Al from the intermediate so that a proportion of the Al to a total of the Si and the Al is 0.1 atm % or more and 1 atm % or less in the active material, wherein the active material includes a silicon clathrate II type crystal phase as a main phase.

2. The method for producing an active material according to claim 1, wherein the preparing step is a step of preparing the Zintl compound by carrying out a heat treatment to a raw material mixture including a Na source, a Si source and an Al source.

3. A method for producing a battery, the method comprising:
   an active material producing step of producing an active material by the method for producing an active material according to claim 1, and
   an anode layer forming step of forming an anode layer by using the active material.

4. The method for producing an active material according to claim 1, wherein a proportion of the Al to a total of the Si and the Al is less than 10 atm % in the Zintl compound.

5. The method for producing an active material according to claim 1, wherein the active material is represented by $Na_x(Si, Al)_{136}$, where $0 \leq x \leq 20$.

6. The method for producing an active material according to claim 1,
   wherein a proportion of the Al to a total of the Si and the Al is less than 10 atm % in the Zintl compound, and
   the active material includes a void inside a primary particle, and
   a void ratio of the void is 2% or more and 15% or less.

* * * * *